(12) United States Patent
Schultz

(10) Patent No.: US 11,034,071 B2
(45) Date of Patent: Jun. 15, 2021

(54) SPEED VARIABLE PUMP

(71) Applicant: Husky Injection Molding Systems Ltd., Bolton (CA)

(72) Inventor: Gregory Allan Schultz, Bolton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 584 days.

(21) Appl. No.: 15/742,917

(22) PCT Filed: Jul. 25, 2016

(86) PCT No.: PCT/CA2016/050874
§ 371 (c)(1),
(2) Date: Jan. 9, 2018

(87) PCT Pub. No.: WO2017/020118
PCT Pub. Date: Feb. 9, 2017

(65) Prior Publication Data
US 2018/0229414 A1  Aug. 16, 2018

Related U.S. Application Data

(60) Provisional application No. 62/199,440, filed on Jul. 31, 2015.

(51) Int. Cl.
*B29C 45/82* (2006.01)
*B29C 45/67* (2006.01)

(52) U.S. Cl.
CPC .............. *B29C 45/82* (2013.01); *B29C 45/67* (2013.01); *B29C 2045/824* (2013.01); *B29C 2945/76307* (2013.01); *B29C 2945/76785* (2013.01)

(58) Field of Classification Search
None
See application file for complete search history.

(56) References Cited

U.S. PATENT DOCUMENTS 5,052,909 A * 10/1991 Hertzer .................. B29C 45/82
                                                              425/150
6,341,953 B1    1/2002 Okubo et al.
(Continued)

FOREIGN PATENT DOCUMENTS

| CA | 2782961     | 5/2015  |
|----|-------------|---------|
| CN | 102712123 A | 10/2012 |

(Continued)

OTHER PUBLICATIONS

PCT International Search Report, Cuerrier, Pierre, dated Aug. 29, 2016, 3 pages.

(Continued)

*Primary Examiner* — Monica A Huson
*Assistant Examiner* — Kelsey C Grace

(57) ABSTRACT

Disclosed is a hydraulic system for a molding system, the molding system having a clamp actuator and an injection actuator, the hydraulic system comprising a clamp accumulator for storing hydraulic fluid for use in actuating the clamp actuator; an injection accumulator for storing hydraulic fluid for use in actuating the injection actuator; a pump for conveying hydraulic fluid to the clamp accumulator and the injection accumulator; and a selector valve for selectively fluidly connecting the pump to one of the clamp accumulator and the injection accumulator.

11 Claims, 4 Drawing Sheets

(56) References Cited

U.S. PATENT DOCUMENTS

| | | | |
|---|---|---|---|
| 8,123,989 B2 | 2/2012 | Notz | |
| 2003/0090018 A1* | 5/2003 | Bulgrin | B29C 45/766 264/40.1 |
| 2007/0052138 A1 | 3/2007 | Yamaura et al. | |
| 2012/0090310 A1 | 4/2012 | Liu et al. | |
| 2014/0030371 A1 | 1/2014 | Schultz et al. | |
| 2015/0037448 A1 | 2/2015 | Schultz | |

FOREIGN PATENT DOCUMENTS

| | | | |
|---|---|---|---|
| JP | 59033130 A | 2/1984 |
| JP | H10128820 A1 | 5/1998 |
| JP | 2001001126 A | 1/2001 |
| JP | 2009226448 A | 10/2009 |
| WO | 2011075812 A1 | 6/2011 |
| WO | 2013120194 A1 | 8/2013 |

OTHER PUBLICATIONS

Manfred Kaper, Im Massanzung von der Strange, Spritzgeissen, Sep. 2003, pp. 60-64, Carl Hanser Verlag, Munchen.

\* cited by examiner

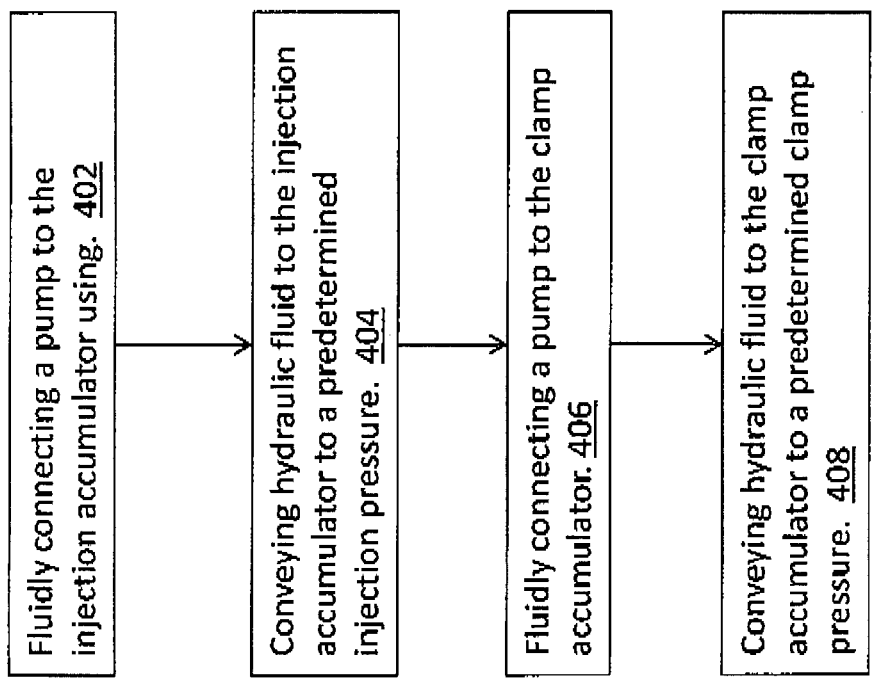

SPEED VARIABLE PUMP

TECHNICAL FIELD

The present disclosure relates to injection molding machines and in particular to hydraulic systems in injection molding machines.

BACKGROUND

Injection molding machines generally include a hopper for receiving resin, a barrel connected to the hopper and a screw that moves within the barrel to impart a force onto the resin to melt and move the resin along the barrel. The melted resin is injected from the barrel into a melt passage apparatus that defines one or more melt passage. The melted resin passes through the melt passage(s) to one or more nozzle. The melted resin is then expelled into a mold cavity through a gate defined in the nozzle. The mold cavity can be formed by clamping two mold plates together.

BRIEF DESCRIPTION OF THE DRAWINGS

FIG. 4 is a flow chart showing a method of operating a hydraulic system for a molding system.

Figure 1:
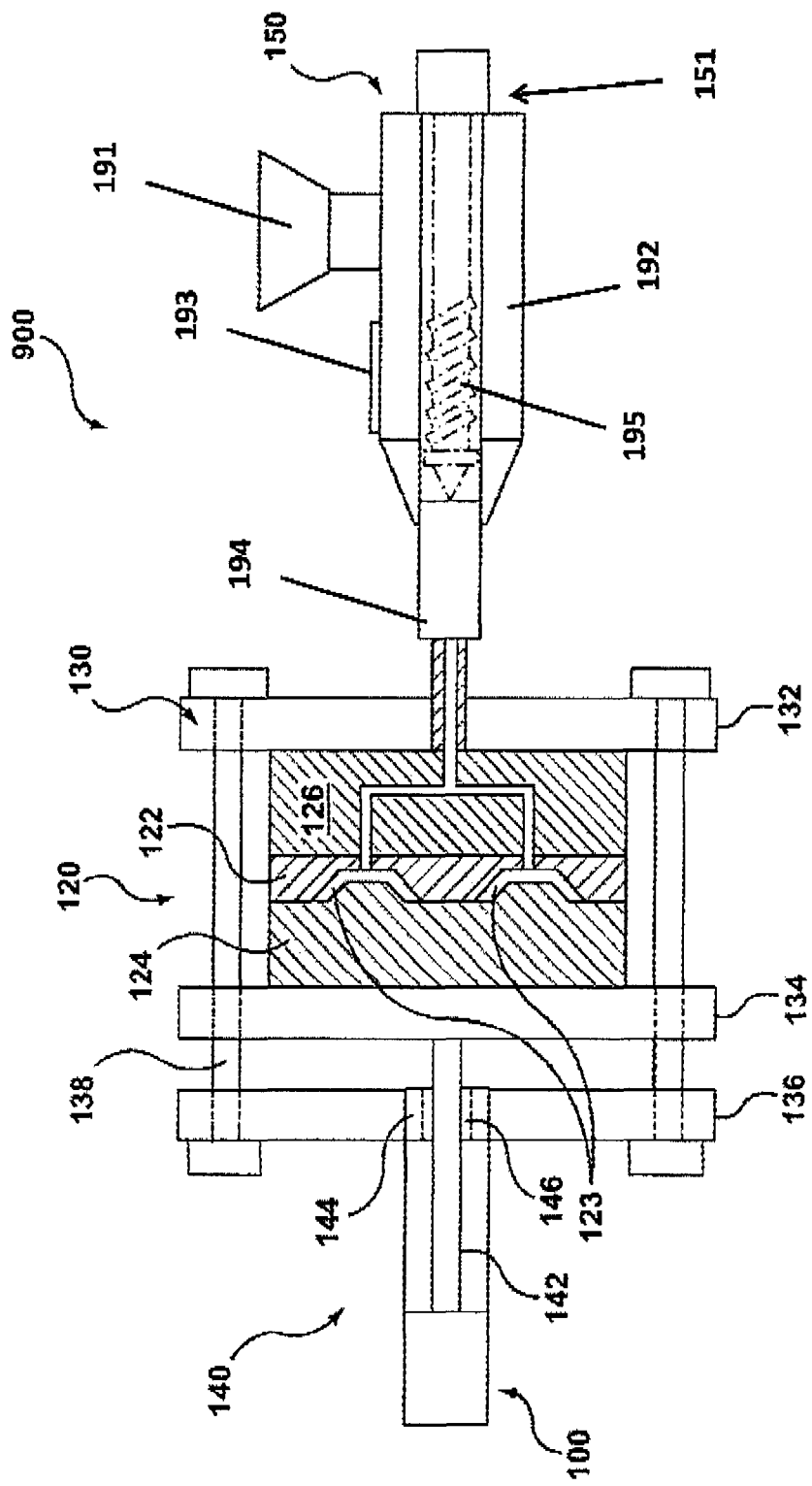
FIG. 1 is a side view of a molding system.

The drawings are not necessarily to scale and may be illustrated by phantom lines, diagrammatic representations and fragmentary views. In certain instances, details that are not necessary for an understanding of the embodiments or that render other details difficult to perceive may have been omitted. Like reference numerals are used in the drawings to identify like elements and features.

DETAILED DESCRIPTION

Disclosed generally is a speed variable pump for use with an injection accumulator and a clamp accumulator. A speed variable pump is a pump that conveys hydraulic fluid at varying flow rates to a hydraulic circuit or to multiple hydraulic circuits. The power or force of the speed variable pump (e.g. as provided by the rotations per minute of the motor for the pump) is adjusted based on the pressure of the hydraulic fluid associated with each of the two or more accumulators or based on the pressure associated with the one or more hydraulic circuit. For example, the speed variable pump conveys hydraulic fluid at a pressure or rate based on a level of pressure in or associated with the accumulator bottles. It is a variable pump because it can control pressure and flow and can convey hydraulic fluid to different accumulators so that the different accumulators have or are charged to different hydraulic pressures. The hydraulic fluid can be conveyed by the pump to the different accumulators during different (i.e. exclusive) time periods. The pump can be connected to a selector valve or another arrangement of one or more valves to so that the pump is selectively connected to specific accumulator(s). For example, a selector valve can be controlled (e.g. by a controller) so that it switches the fluid connection from between the pump and a first accumulator to between the pump and a second accumulator. The control of the selector valve can be automatic (e.g. the selector valve can be switched at a predetermined time or on the occurrence of a predetermined event) or can be based on sensed properties of the molding system or hydraulic fluid. In these ways different accumulators can be independently charged with different levels of pressure.

By way of further description, the hydraulic system described in this document can employ two accumulators, one for each of two sub-systems, and a single pump, which may be called a speed variable pump, to supply hydraulic fluid at a first pressure to the first accumulator and at a second pressure to the second accumulator. The first accumulator feeds pressurized hydraulic fluid to the mold clamping unit hydraulic circuit. The mold clamping unit hydraulic circuit is the hydraulic circuit through which hydraulic fluid flow for actuating the clamping pressure on the mold. The second accumulator feeds pressurized hydraulic fluid to the injection unit hydraulic circuit. The injection unit hydraulic circuit is the hydraulic circuit through which hydraulic fluid flows for actuating the injection unit (e.g. to inject resin into the melt distribution assembly or melt passage apparatus or hot runner). In this way, different pressures can be supplied to the two machine systems requiring hydraulic pressure (the injection unit hydraulic circuit and the clamping unit hydraulic circuit). As a result, the overall electrical energy consumption of the injection molding machine or molding system can be reduced as compared to conventional arrangements, yet the speed of operation can remain the same. Thus, the arrangement described in this document provides for fast-acting, low-energy-consumption independent hydraulic pressures. Selector valves can switch the pump to supply one accumulator at a time and the pump will charge each accumulator to its desired level. Therefore, the clamping unit circuit can have a different pressure than the injection unit circuit.

In one aspect, disclosed is a hydraulic system for a molding system, the molding system having a clamp actuator and an injection actuator, the hydraulic system comprises a clamp accumulator for storing hydraulic fluid for use in actuating the clamp actuator; an injection accumulator for storing hydraulic fluid for use in actuating the injection actuator; a pump for conveying hydraulic fluid to the clamp accumulator and the injection accumulator; and a selector valve for selectively fluidly connecting the pump to one of the clamp accumulator and the injection accumulator.

In some embodiments the hydraulic system further comprises a reservoir for storing hydraulic fluid, wherein the pump is connected to the reservoir and wherein the pump is configured to convey hydraulic fluid from the reservoir through the selector valve to one of the injection accumulator and the clamp accumulator.

In some embodiments of the hydraulic system the molding system has a mold ejector unit, the hydraulic system further comprising: an ejector accumulator for storing hydraulic fluid for use in actuating the mold ejector unit, wherein the selector valve selectively fluidly connects the pump to either both of the clamp accumulator and the ejector accumulator or the injection accumulator.

In some embodiments of the hydraulic system the ejector accumulator is connected in parallel with the clamp accumulator.

In some embodiments of the hydraulic system the molding system has a mold ejector unit, the hydraulic system further comprising: an ejector accumulator for storing hydraulic fluid for use in actuating the mold ejector unit, wherein the selector valve selectively fluidly connects the pump to either both of the injection accumulator and the ejector accumulator or the clamp accumulator.

In some embodiments of the hydraulic system the ejector accumulator is connected in parallel with the injection accumulator.

In some embodiments the hydraulic system further comprises: a sensor being configured to measure a property of the hydraulic fluid and wherein the pump is a servo pump configured to convey hydraulic fluid based on the measurement of the property.

In some embodiments of the hydraulic system the sensor is configured to measure a property of the hydraulic fluid in one of the clamp accumulator and the injection accumulator.

In some embodiments the hydraulic system further comprises: a sensor configured to measure a property of the hydraulic fluid; and a controller connected to the sensor for receiving the measurements from the sensor, the controller connected to the pump for controlling the conveyance of hydraulic fluid from the pump, the controller having: a memory for storing instructions; and a processor for executing the instructions stored on the memory to control the operation of the pump based on the received measurements.

In some embodiments of the hydraulic system the sensor is configured to measure a property of the hydraulic fluid in one of the clamp accumulator and the injection accumulator.

In some embodiments of the hydraulic system the controller further comprises a timer for timing an injection cycle, and wherein the processor controls the operation of the pump based on the received measurements and based on the time during the injection cycle.

In some embodiments of the hydraulic system the sensor is a pressure sensor and the measured property is the pressure of the hydraulic fluid.

In some embodiments of the hydraulic system the sensor is connected to the clamp accumulator and the sensor is configured to measure the pressure of the hydraulic fluid in the clamp accumulator.

In some embodiments of the hydraulic system the sensor is connected to the injection accumulator and the sensor is configured to measure the pressure of the hydraulic fluid in the injection accumulator.

In some embodiments of the hydraulic system the sensor is configured to measure the pressure of the hydraulic fluid between the injection accumulator and the injection actuator.

In some embodiments of the hydraulic system the sensor is configured to measure the pressure of the hydraulic fluid between the clamp accumulator and the clamp actuator.

In some embodiments of the hydraulic system there are a plurality of sensors configured to measure the pressure of the hydraulic fluid (i) between the injection accumulator and the injection actuator, (ii) between the clamp accumulator and the clamp actuator, and (iii) between the pump and the reservoir.

In some embodiments of the hydraulic system the selector valve comprises an injection circuit valve configured to selectively connect and disconnect the pump to the injection accumulator, and a clamp circuit valve configured to selectively connect and disconnect the pump to the clamp accumulator.

In some embodiments of the hydraulic system the injection accumulator is fluidly connected to an injection actuator and wherein the clamp accumulator is fluidly connected to a clamp actuator.

In some embodiments the hydraulic system further comprises a check valve for inhibiting a flow of hydraulic fluid from the clamp accumulator and injection accumulator to the pump.

In another aspect, disclosed is a method of operating a hydraulic system for a molding system, the molding system having an injection accumulator for providing hydraulic pressure to actuate an injection actuator, and the molding system having a clamp accumulator for providing hydraulic pressure to actuate a clamp actuator, the method comprising: fluidly connecting a pump to the injection accumulator; conveying hydraulic fluid to the injection accumulator to charge the injection accumulator to a predetermined injection pressure; fluidly connecting the pump to the clamp accumulator; and conveying hydraulic fluid to the clamp accumulator to charge the clamp accumulator to a predetermined clamp pressure.

In some embodiments of the method of operating a hydraulic system a selector valve is implemented to fluidly connect the pump to the injection accumulator and the selector valve is switched to fluidly connect the pump to the clamp accumulator.

In some embodiments of the method of operating a hydraulic system the clamp pressure is different from the injection pressure.

In some embodiments of the method of operating a hydraulic system the molding system comprises an ejection accumulator for providing hydraulic fluid to actuate a mold eject unit, and wherein conveying hydraulic fluid to the clamp accumulator comprises conveying hydraulic fluid to the clamp accumulator and the ejection accumulator to a predetermined clamp pressure.

In some embodiments the method of operating a hydraulic system further comprises adjusting the pump based on a pressure measurement associated with one or more of the clamp accumulator and the injection accumulator to achieve the predetermined injection pressure and the predetermined clamp pressure.

In some embodiments of the method of operating a hydraulic system conveying hydraulic fluid to the injection accumulator occurs before conveying hydraulic fluid to the clamp accumulator.

In another aspect, disclosed is a method of operating a hydraulic system for a molding system, the molding system having an injection accumulator for providing hydraulic pressure to actuate an injection actuator, and the molding system having a clamp accumulator for providing hydraulic pressure to actuate a clamp actuator, the method comprising: fluidly connecting a pump to the injection accumulator using a selector valve; conveying hydraulic fluid to the injection accumulator to charge the injection accumulator to a predetermined injection pressure; switching the selector valve to fluidly connect the pump to the clamp accumulator; and conveying hydraulic fluid to the clamp accumulator to charge the clamp accumulator to a predetermined clamp pressure.

In another aspect, disclosed is a hydraulic system for a molding system, the molding system having a clamp actuator and an injection actuator, the hydraulic system comprising: a clamp accumulator for storing hydraulic fluid for use in actuating the clamp actuator; an injection accumulator for storing hydraulic fluid for use in actuating the injection actuator; a first pump for conveying hydraulic fluid to the injection accumulator; a second pump for conveying hydraulic fluid to the clamp accumulator; and a controller for controlling the operation of the first pump and the second pump to ensure that the pressure level of the injection accumulator is independent of the pressure level of the clamp accumulator.

Described below are one or more embodiments of the foregoing aspects.

Molding System

FIG. 1 depicts a schematic representation of a molding system 900. The molding system 900 is an injection molding machine. Another example of a molding system, not depicted, is a compression molding system. The molding system 900 includes a clamp assembly 130, an injection unit 150, an injection actuator 151, a molding material distributor 126, a mold assembly 120, and a clamp actuator 100.

The clamp assembly 130 includes a first platen 132, a movable platen 134, a second platen 136, tie bars 138, and a clamp 140. The first platen 132 and the second platen 136 are stationary platens. The movable platen 134 is arranged and adapted to move between the first platen 132 and the second platen 136. The movable platen 134 is disposed between the first platen 132 and the second platen 136.

The tie bars 138 extend from the first platen 132 to the second platen 136. There are four tie bars 138 with each tie bar 138 connecting one of the four corners (approximately) of the first platen 132 to a respective corner (approximately) of the second platen 136. The first platen 132 and the second platen 136 can be fixed to the tie bars 138. The tie bars 138 extend through the corresponding respective corners (approximately) of the movable platen 134. The movable platen 134 is slidably connected to the tie bars 138 such that the movable platen can move or slide along the tie bars 138 between the first platen 132 and the second platen 136.

The clamp 140 and clamp actuator 100 operate together to move the movable platen 134 relative to the second platen 136. The clamp 140 is actuated by the clamp actuator 100. The second platen 136 is connected to or otherwise associated with the clamp 140. When the clamp 140 is actuated the clamp applies a clamping force to push the movable platen 134 toward the first platen 132. The clamp 140 may also pull the tie bars 138 toward the second platen 136. Accordingly, the clamping force is applied across the first platen 132 and the movable platen 134.

The clamp 140 includes a clamp piston 142 and a clamp cylinder 144. The clamp cylinder 144 defines a cylindrical bore 146. The clamp piston 142 is disposed within the cylindrical bore 146 and can linearly move within the cylindrical bore 146. The clamp cylinder 144 is connected to the second platen 136. The clamp cylinder 144 can be integrally formed with the second platen 136. The clamp piston 142 extends through a hole in the second platen 136 so that an end of the clamp piston 142 is connected the movable platen 134. When the clamp piston 142 moves towards the first platen 132 the clamp cylinder 144 remains stationary with the second platen 136 so that movable platen 134 also moves toward the first platen 132.

The clamp actuator 100 can include a hydraulic chamber that is configured to provide hydraulic pressure to move the clamp piston 142 relative to the clamp cylinder 144 thereby providing the clamping force across the first platen 132 and the movable platen 134. The clamp piston 142 may be considered as a component of the clamp actuator 100.

Suitable mechanisms other than the clamp 140, described above, can be used with the clamp actuator 100 to move the movable platen 134 relative to the first platen 132 and second platen 136. Similarly, other mechanisms can be used with the clamp actuator 100 to apply a clamp force across the movable platen 134 and first platen 132.

The injection unit 150 generally includes a hopper 191, a barrel 192, a heater 193, a screw 195 and a machine nozzle 194. The barrel 192 has a hollow interior connected to the hopper 191.

The hopper 191 is designed to receive resin (e.g. pellets) and to allow the resin to be fed to the interior of the barrel 192. The heater 193 is connected to the barrel 192 and provides heat to the barrel 192 in order to melt the resin inside of the barrel 192. There may be multiple or no heater 193 connected to the barrel 192 in other embodiments. The screw 195 is disposed within the hollow interior of the barrel 192. The screw 195 is adapted to rotate and to move linearly within the hollow interior of the barrel 192 so as to mix, melt and transmit a linear for to the resin in the barrel 192. In some embodiments the screw 195 is adapted only to rotate to mix the resin. In some embodiments the screw 195 is used only to mix the resin. In some embodiments the screw 195 is used to partially melt the resin. The machine nozzle 194 is connected at an end of the barrel 192. The machine nozzle 194 provides a fluid connected between the barrel and the molding material distributor. The machine nozzle 194 has an outlet for ejecting or expelling resin. When the screw 195 transmits a linear force to the resin the resin moves through the machine nozzle 194 and out of its outlet.

The injection actuator 151 actuates the screw 195 so as to provide a linear force to the resin. For example, the injection actuator 151 can cause the screw 195 to move linearly within the barrel 192 towards the machine nozzle 194. This force causes the resin to be ejected from the machine nozzle 194 (e.g. through its outlet) and into the molding material distributor 126. In alternative examples, the injection unit 150 includes a shooting pot plunger (not shown) that can be actuated by the injection actuator 151 to push the resin into the molding material distributor 126. In such example embodiments, the injection actuator 151 can cause the shooting pot plunger to move linearly within a shooting pot cylinder (not shown) instead of the screw 195. The injection actuator 151 thus causes the resin to be injected under pressure into the molding material distributor 126.

The molding material distributor 126 is configured to receive the resin from the injection unit 150 and distribute the resin to a mold cavity 123. The mold cavity 123 is defined by the mold assembly 120. The mold cavity 123 is the space into which the resin is injected to form a molded part. The injection of the resin into the mold cavity 123 can be formed when a clamping force is being applied across the movable platen 134 and the first platen 132 (i.e. when the clamp actuator 100 is actuating the clamp 140). The molding material distributor 126 is connected to or otherwise associated with the first platen 132. The mold assembly 120 includes a stationary mold portion 122 and a movable mold portion 124. The stationary mold portion 122 is connected to or otherwise associated with the first platen 132. The movable mold portion 124 is connected to or otherwise associated with the movable platen 134. The stationary mold portion 122 and the movable mold portion 124 cooperate to define the mold cavity 123.

Movement of the movable platen 134 moves the movable mold portion 124 towards the stationary mold portion 122 thereby closing the mold assembly 120 and forming the mold cavity 123. The mold cavity 123 is formed in between the stationary mold portion 122 and movable mold portion 124 when the mold assembly 120 is closed.

Generally the clamp actuator 100 moves a payload relative to a support structure. In the embodiment shown in the figure the payload is the movable platen 134, the clamp piston 142, or the movable mold portion 124. In the embodiment shown, the support structure is the second platen 136, the tie bars 138, or the clamp cylinder 144.

In operation, the clamp actuator 100 extends and retracts the clamp piston 142 causing the movable platen 134 to move towards and away from the first platen 132, respectively. When the movable platen 134 is moved towards first platen 132, the mold assembly 120 becomes closed. When the mold assembly 120 is in the closed position, the clamp actuator 100 can cause a further clamping force to be applied by forcing the movable platen 134 against or towards the first platen 132. This further clamping force squeezes the mold assembly 120 together. The clamping force can squeeze the mold assembly 120 together while the injection unit 150 injects the mold cavity 123 with the resin.

FIG. 1 shows an exemplary embodiment of the molding system 900. There are other embodiments of the molding system 900 in which the clamp actuator 100 can provide a clamping force. For example, the molding system may only have two platens (e.g. a movable platen 134 and a first platen 132), or the clamp 140 or injection unit 150 may have different configurations.

The molding system 900 can also include an ejector unit, which is not shown. The ejector unit is a machine component that is configured to eject a molded part (or molded parts) from the mold assembly 120 when the mold assembly 120 is opened. The mold assembly 120 is opened when the movable platen 134 is moved away from the first platen 132.

The ejector unit has an ejector unit actuator that is configured to supply a force to the ejector unit so as to eject the molded part(s) from the mold assembly 120. The ejector unit may have arms or other components that are designed or adapted to punch out or remove the molded parts from the mold cavity 123. The ejector unit actuator can provide the force required for the arms or other components to remove or punch out the molded parts.

The clamp actuator 100, ejector unit actuator and injection actuator 151 can be hydraulically operated actuators. For example, the clamp actuator 100, ejector unit actuator and injection actuator 151 can each actuate their respective components using a hydraulic force or pressure.

This hydraulic force or pressure can be provided by a hydraulic pump or an accumulator. For example, there may be dedicated accumulators for each of (or one or more of) the clamp actuator 100, the ejector unit actuator and the injection actuator 151.

The Hydraulic System 200

Figure 2:
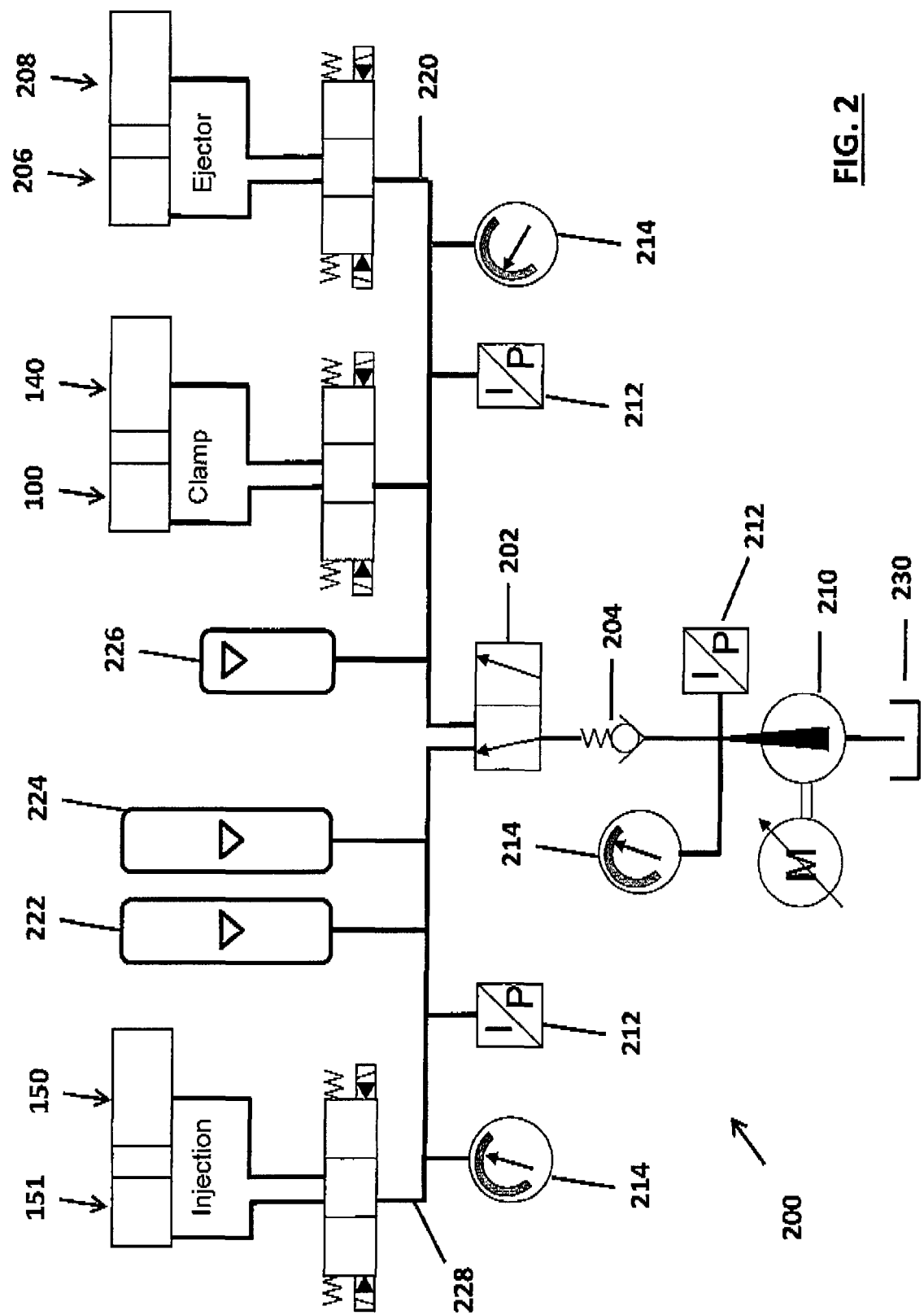
FIG. 2 is a schematic view of a hydraulic system for a molding system.

FIG. 2 is a schematic diagram depicting an exemplary embodiment of a hydraulic system 200. The hydraulic system 200 is for a molding system 900 that has a clamp actuator 100 and an injection actuator 151, such as shown in FIG. 1. The hydraulic system 200 has a clamp accumulator 226, an injection accumulator 222, a pump 210 and a selector valve 202.

The clamp accumulator 226 and injection accumulator 222 are examples of hydraulic accumulators. Hydraulic accumulators are reservoirs for storing hydraulic fluid under high pressure. The clamp accumulator 226 and injection accumulator 222 can be charged (or provided with pressurized hydraulic fluid) by the pump 210. The selector valve 202 is a valve mechanism that can either by in a clamp open position or in an injection open position. If the selector valve 202 is in a clamp open position then the clamp accumulator 226 can be provided with pressurized hydraulic fluid or charged by the pump 210 but the injection accumulator 222 cannot be provided with hydraulic fluid or charged by the pump 210. If the selector valve 202 is in an injector open position then the injection accumulator 222 can be provided with pressurized hydraulic fluid or charged by the pump 210 but the clamp accumulator 226 cannot be provided with pressurized hydraulic fluid or charged by the pump 210.

The clamp accumulator 226 is for storing hydraulic fluid for use in actuating the clamp actuator 100. The injection accumulator 222 is for storing hydraulic fluid for use in actuating the injection actuator 151. The pump 210 is for conveying hydraulic fluid to the clamp accumulator 226 or the injection accumulator 222. The selector valve 202 is for selectively fluidly connecting the pump 210 to one of the clamp accumulator 226 and injection accumulator 222 so that whichever of the clamp accumulator 226 and injection accumulator 22 is fluidly connected to the pump 210 can receive pressurized hydraulic fluid or can be charged. "Fluidly connecting" is intended to mean connecting so that fluid (e.g. hydraulic fluid) can pass therebetween.

A clamp fluid passage 220 extends from the pump 210 through the selector valve 202 to the clamp actuator 100. The clamp accumulator 226 is fluidly connected to the clamp fluid passage 220 in between the clamp actuator 100 and the selector valve 202. Fluid, such as hydraulic fluid, can flow within the clamp fluid passage 220. The clamp fluid passage 220 can also be called the clamp circuit. For example, the selector valve 202 can be open to the clamp circuit, which means the selector valve 202 is fluidly connecting the pump 210 to the clamp actuator 100 by way of the clamp fluid passage 220. When the selector valve 202 is open to the clamp circuit then fluid can be conveyed by the pump 210 through the selector valve 202 along the clamp fluid passage 220 to the clamp accumulator 226. The fluid can also pass from the clamp accumulator 226 along the clamp fluid passage 220 to the clamp actuator 100, thereby actuating the clamp 140. When the selector valve 202 is closed to the clamp circuit, then fluid cannot be conveyed from the pump 210 through the selector valve 202 to the clamp accumulator 226 or to the clamp actuator 100.

Similarly, the injection fluid passage 228 extends from the pump 210 through the selector valve 202 to the injection actuator 151. The injection accumulator 222 is fluidly connected to the injection fluid passage 228 in between the injection actuator 151 and the selector valve 202. Fluid, such as hydraulic fluid, can flow within the injection fluid passage 228. The injection fluid passage 228 can also be called the injection circuit. The selector valve 202 can be open to the injection circuit, which means that the selector valve 202 is fluidly connecting the pump 210 to the injection actuator 151 by way of the injection fluid passage 228. The fluid can also pass from the injection accumulator 222 along the injection fluid passage 228 to the injection actuator 151, thereby actuating the injection unit. When the selector valve 202 is closed to the injection circuit, then fluid conveyed by the pump 210 cannot pass through the selector valve 202 to the injection accumulator 222 or to the injection actuator.

In one or more embodiments, the selector valve 202 can be open to either the clamp circuit or the injection circuit but not both simultaneously. In some embodiments, the selector valve 202 is open to both the clamp circuit and injection circuit for a relatively short period of time (e.g. 0.05 second) while the selector valve 202 switches from being open to the clamp circuit from the injection circuit and vice versa. This brief time period of having the selector valve 202 open to both the clamp circuit and injection circuit can prevent or inhibit hydraulic shock (or water hammer) which could otherwise occur when switching or shifting the selector valve 202. During this relatively short period of time, a relative small amount of hydraulic fluid can generally flow from the highest pressure source to the lowest pressure source. This relatively brief period of time can be considered a delay in shifting or switching the valve from the clamp circuit to the injection circuit and vice versa. In an embodiment, the clamp accumulator 226 is charged (i.e. provided with high pressure hydraulic fluid by the pump 210) for approximately 0.5 seconds. In an embodiment, the injection accumulator 222 is charged (i.e. provided with a high pressure hydraulic fluid by the pump 210) for approximately 1.2 seconds. In an embodiment, the clamp accumulator 226 is charged completely before the injection accumulator 222 is charged. In an embodiment in which the hydraulic system includes an ejector accumulator, the clamp accumulator 226 is charged completely before the injection accumulator 222 is charged and the injection accumulator 222 is charged completely before the ejector accumulator is charged.

During the relatively short period of time that the selector valve 202 is open to both the clamp circuit and the injection circuit the pump 210 can be providing a lower pressure than one or both of the clamp accumulator 226 and injection accumulator 222. Alternatively, during the relatively short period of time that the selector valve 202 is open to both the clamp circuit and the injection circuit the pump 210 can be providing a higher pressure than both of the clamp accumulator 226 and injection accumulator 222.

In some embodiments, the selector valve 202 can be an injection circuit valve and a clamp circuit valve operating together. The injection circuit valve can be configured to selectively connect and disconnect the pump 210 to the injection accumulator 222. The clamp circuit valve can be configured to selective connect and disconnect the pump 210 to the clamp accumulator 226. In such embodiments, the injection circuit valve and the clamp circuit valve can be connected to the pump 210 such that either the injection circuit valve is open or the clamp circuit valve is open. For example, a controller can be controlling the operation of the injection circuit valve and clamp circuit valve so that only one (or at most one) of the injection circuit valve and the clamp circuit valve is open at a given time.

The hydraulic system can also include a reservoir 230. The reservoir 230 is for storing hydraulic fluid. The pump 210 can be connected to the reservoir 230. The pump 210 can be configured to convey hydraulic fluid from the reservoir 230 through the selector valve 202 to one of the injection accumulator 222 or the clamp accumulator 226.

Optionally, the molding system 900 includes a mold ejector unit 208. In such embodiments, the hydraulic system also has an ejector accumulator. The ejector accumulator (not shown) is for storing hydraulic fluid for use in actuating the mold ejector unit 208. For example, the ejector accumulator can provide hydraulic fluid to an ejector actuator 206 to actuate the mold ejector unit 208. In such embodiments, the clamp fluid passage 220 is fluidly connected to both the clamp accumulator 226 and the ejector accumulator (e.g. in parallel or in series). The clamp fluid passage 220 is also connected to both the clamp actuator 100 and the ejector actuator 206.

In another embodiment, as shown in FIG. 2, the molding system 900 includes a mold ejector unit 208 but the hydraulic system 200 does not have an ejector accumulator. Instead, the hydraulic system 200 uses the clamp accumulator 226 to provide hydraulic fluid to the ejector actuator 206. The ejector actuator 206 is fluidly connected to the clamp fluid passage 220 in series with the clamp actuator 100. In an alternative embodiment, the ejector actuator 206 is fluidly connected to the clamp fluid passage 220 in parallel with the clamp actuator 100.

In some embodiments in which the molding system 900 includes a mold ejector unit 208 and in which the hydraulic system includes an ejector accumulator, the selector valve 202 selectively fluidly connects the pump 210 to either both of the clamp accumulator 226 and ejector accumulator or to just the injection accumulator 222.

In some embodiments, the molding system 900 includes the mold ejector unit 208 but the mold ejector unit 208 is associated with the injection circuit rather than the clamp circuit. In such embodiments, and the ejector actuator 206 is connected to the injection fluid passage 228. The ejector actuator can be connected to the injection fluid passage 228 either in series or in parallel with the injection actuator 151.

When the molding system 900 includes the mold ejector unit 208 and the mold ejector unit 208 is on the injection circuit, the hydraulic system 200 can include an ejector accumulator (not shown) fluidly connected to the injection fluid passage 288. The ejector accumulator is used to provide hydraulic fluid to the ejector actuator 206 to actuate the ejector actuator 206 and can be connected to the injection fluid passage 228 either in parallel or in series with the injection accumulator. Alternatively, the injection accumulator 222 can be used to provide hydraulic fluid to the ejector actuator 206 in order to actuate the ejector actuator 206.

In each described embodiment, optionally a supplementary accumulator can be used to provide supplemental (or additional) hydraulic fluid to the respective actuator.

There may be more than one injection accumulator 222. For example, as shown in FIG. 2, there is an injection accumulator 222 and a supplementary injection accumulator 224 in series. In alternative embodiments there may be multiple injection accumulators in parallel. Similarly, there may be multiple clamp accumulators. The additional or supplementary accumulators (e.g. the supplementary injection accumulator 224) can provide additional hydraulic fluid to the respective actuator.

A check valve 204 can be located between the pump 210 and the selector valve 202. The check valve 204 is a valve that prevents or inhibits the flow of hydraulic fluid or pressure from the injection circuit and clamp circuit (e.g. from the injection accumulator 222 and clamp accumulator 226) back to the pump 210 but that allows the flow of hydraulic fluid or pressure from the pump 210 towards the selector valve 202. By way of further example, the check valve 204 can prevent the flow of hydraulic fluid or pressure from the selector valve 202 to the pump 210.

In operation the check valve 204 allows the pump 210 (and the motor for the pump 210) to operate at a minimum speed and pressure without having to hold against the pressure from the injection accumulator 222 or clamp accumulator 226 (or any other accumulators being used in the hydraulic system 200). When the pump 210 has to hold against the pressure, the pump 210 has to counteract the hydraulic force acting on the pump 210 from the injection accumulator 222 or clamp accumulator 226 (or other accumulators being used).

A sensor 212 can be connected to the pump 210. The sensor 212 is configured to measure a property of the hydraulic fluid. For example, the sensor 212 can be connected to the clamp accumulator 226 to measure (or otherwise configured to measure) a property of the hydraulic fluid in the clamp accumulator 226. Similarly, the sensor 212 can be connected to the injection accumulator to measure (or otherwise configured to measure) a property of the hydraulic fluid in the injection accumulator 222. In another embodiment, the sensor 212 can be configured to measure a property of the hydraulic fluid between the injection accumulator 222 and the injection actuator 151. For example, the sensor 212 can be disposed on the injection fluid passage 228 between the injection accumulator 222 and the injection actuator 151 in order to measure the hydraulic pressure in the injection fluid passage 228.

In other embodiments, there can be a plurality of sensors 212 for measuring a property of the hydraulic fluid at various places within the hydraulic system 200. For example, as shown in FIG. 2, there can be three sensors 212 for measuring a property of the hydraulic fluid (i) between the injection accumulator 222 and the injection actuator 151, (ii) between the clamp accumulator 226 and the clamp actuator 100, and (iii) between the pump 210 and the reservoir 230.

In each of the described embodiments, the property measured by the sensors 212 can be the pressure of the hydraulic fluid. In other embodiments, the sensors 212 can measure other properties, such as the temperature of the hydraulic fluid.

Each sensor 212 can be associated with a respective display 214, such as a pump meter showing the measured property. For example, the sensor 212 can be a pressure sensor and the display 214 can show the respective pressure measurements. The pressure (or other property) can be measured periodically by the sensor 212. The display 214 can be disposed near the respective sensor 212 or each of multiple sensors 212 can transmit data representative of the measured property to a central interface (e.g. a human machine interface) where the data representative of the measured property, such as a pressure reading, can be displayed. In the embodiment shown in FIG. 2 there are three sensors 212 with each sensor 212 having a dedicated display 214.

In some embodiments, the sensor 212 or sensors 212 are in communication with the pump 210 and the pump 210 can be a servo pump configured to convey hydraulic fluid based on the measurement of the property. For example, the sensor 212 can be a pressure sensor and the pump 210 can be a fixed displacement pump with a motor attached that changes the RPM of the pump 210 to control the resultant pressure measured by the pressure sensor 212. For example, the pump 210 can be a servo pump. Alternatively, the pump 210 can be a variable displacement pump with a fixed RMP motor and a pump controller that operates based on the measured pressure.

In another embodiment, instead of the selector valve 202 two pumps 210 can be used. One pump 210 is for providing hydraulic fluid to the clamp accumulator 226 through the clamp fluid passage 220 and the other pump 210 is for providing hydraulic fluid to the injection accumulator 222 through the injection fluid passage 228. The pressure of each of the pumps 210 could be controlled by a controller based on measured pressures from two respective sensors 212, with one of the sensors 212 measuring the pressure associated with the clamp fluid passage 220 or clamp accumulator 226 and with the other sensor 212 measuring the pressure associated with the injection fluid passage 228.

In some embodiments the hydraulic system 200 includes a controller connected to the sensor 212. The controller can be connected to the sensor 212 (or sensors 212) so that the controller can receive data from and transmit data to or otherwise communicate with the sensors 212. The connection does not need to be a physical connection. For example, the data can be transmitted between the sensor 212 and controller over a wireless network or a wired connection. The controller is connected to the sensor 212 for receiving the measurements of the property of the hydraulic fluid from the sensor 212. For example, the controller can receive from the sensor 212 data representative of the measurements of the property of the hydraulic fluid. For example, the sensor 212 can be a digital pressure sensor in that it records the pressure in a digital form and stores it locally on a memory or transmits the data directly to the controller.

In some embodiments, the controller is connected to the pump 210 for controlling the conveyance of hydraulic fluid from the pump 210. The controller has a memory for storing instructions and a processor for executing the instruction stored on the memory. The processor executes the instructions to control the operation of the pump 210 based on the received measurements.

The controller can also include a timer for timing an injection cycle. In such embodiments, the processor controls the operation of the pump 210 based on the received measurements and based on the time during the injection cycle.

The controller can also control the action of the selector valve 202 in response to sensed data received from a sensor 212. For example, the control can cause the selector valve 202 to be switched to fluidly connect the pump 210 to the clamp accumulator 226 instead of to the injection accumulator 222. By way of further example, the controller can control the operation of the selector valve 202 in response to the received data from the sensor 212.

Figure 3:
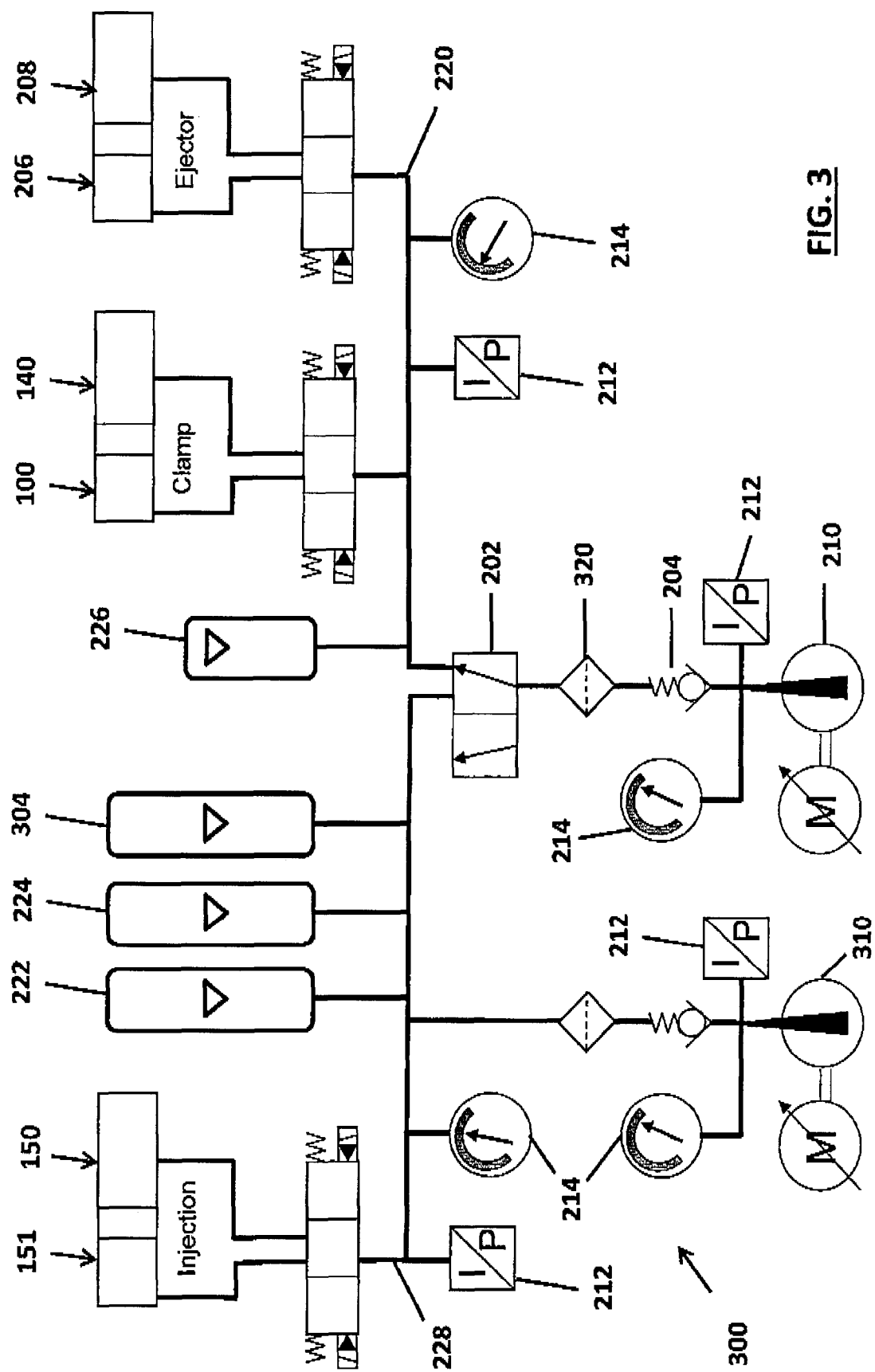
FIG. 3 is a schematic view of a hydraulic system for a molding system.

FIG. 3 is a schematic diagram depicting an exemplary embodiment of a hydraulic system 300. The hydraulic system 300 includes the pump 210 and a second pump 310. The second pump 310 is fluidly connected to the injection circuit and not the clamp circuit. The second pump 310 can be connect to the reservoir 230 or to a second dedicated reservoir. In one or more embodiments, the second pump 310 can be a fixed RPM pump.

In another embodiment, there is a first pump that is dedicated to the clamp circuit and a second pump that is dedicated to the injection circuit. In such an embodiment, neither the first pump nor the second pump is connected to a selector valve 202. In such an embodiment, the clamp circuit can be isolated from the injection circuit so that they are at independent pressure levels.

A second supplementary accumulator bottle 304 is shown in the hydraulic system 300. There may be fewer or more supplementary accumulator bottles 304 than is shown in the depicted hydraulic system 300.

Operation of the Hydraulic System

FIG. 4 shows a method 400 of operating a hydraulic system 200 for a molding system 900. The molding system 900 can be a molding system 900 such as the one shown in FIG. 1. For example, the molding system 900 can include a hydraulic system 200 and can have an injection accumulator 222 for providing hydraulic pressure to actuate an injection actuator 151, and the molding system 900 can have a clamp accumulator 226 for providing hydraulic pressure to actuate a clamp actuator 100.

With reference to FIG. 3, at 402 a pump 210 is fluidly connected to an injection accumulator 222 using a selector valve 202. In alternative embodiments, rather than using a selector valve 202, the pump 210 can be fluidly connected to the injection accumulator 222 using a dedicated injection valve. In such an alternative embodiment, there may also be a dedicated clamp valve which disconnects the pump 210 from the clamp accumulator 226 when the pump 210 is fluidly connected to the injection accumulator 222. When the pump 210 is fluidly connected to the injection accumulator 222, the selector valve 202 is arranged such that the pump 210 is not fluidly connected to the clamp accumulator 226.

At 404, hydraulic fluid is conveyed to the injection accumulator 222 to charge the injection accumulator 222 to a predetermined injection pressure. The predetermined injection pressure can be stored in a memory associated with a controller. For example, the predetermined injection pressure level can be input by a user or can be input at manufacture time or can be automatically set (e.g. using a controller running a software program). The predetermined injection pressure can be associated with a time during the injection cycle.

At 406, the selector valve 202 is switched to fluidly connect the pump 210 to the clamp accumulator 226. When the selector valve 202 is switched to fluidly connect the pump 210 to the clamp accumulator 226, the pump 210 is no longer fluidly connected to the injection accumulator 222. In an alternative embodiment, there may be a dedicated clamp valve that fluidly connects the pump 210 to the clamp accumulator 226. In such embodiment there is also an injection valve. When the clamp valve is fluidly connecting the pump 210 to the clamp accumulator 226, the injection valve is disconnected such that the pump 210 is no longer fluidly connected to the injection accumulator 222.

In one or more embodiments, the controller controls the switching of the selector valve 202. For example, the controller can control when the selector valve 202 is switched to fluidly connect the pump 210 to the clamp accumulator 226. The control of the selector valve 202 can be performed based on predetermined instructions. For example, the predetermined instructions can indicate that the selector valve 202 is to be switched to fluidly connect the pump 210 to the clamp accumulator 226 when the sensed data reaches a predetermined value.

At 408, hydraulic fluid is conveyed to the clamp accumulator 226 to charge the clamp accumulator 226 to a predetermined clamp pressure. The predetermined clamp pressure can be stored in a memory associated with a controller. For example, the predetermined clamp pressure level can be input by a user or can be input at manufacture time or can be automatically set (e.g. using a controller running a software program). The predetermined clamp pressure can be associated with a time during the injection cycle.

In one or more embodiments, the predetermined clamp pressure can be different from the predetermined injection pressure.

Using this method 400, the clamp accumulator 226 and injection accumulator 222 can be charged to desired and potentially different pressures.

The pump 210 can also be called a speed variable pump.

In one or more embodiments, the pump 210 can be operated with a fixed RPM motor and a controller that alters the displacement of the pump 210. By altering the displacement of the pump 210, the controller controls the pressure and flow provided by the pump 210.

In one or more embodiments, the pump 210 can be a variable displacement pump that has a variable RMP motor.

Other non-limiting embodiments, modifications and equivalents will be evident to one of ordinary skill in the art in view of the present disclosure.

This disclosure has presented one or more non-limiting exemplary embodiments. It will be clear to those skilled in the art that modifications and variations can be made to the disclosed non-limiting embodiments without departing from the intended scope of this disclosure. The described non-limiting embodiments ought to be considered to be merely illustrative of some of the features or elements of this disclosure as a whole. Other beneficial results can be realized by applying the non-limiting embodiments in a different manner or modifying them in ways known to those familiar with the art. Certain features or sub-features of one embodiment may be combined with certain features or sub-features of another embodiment to arrive at a combination of features not specifically described above but still within the intended scope of the disclosure. Any such suitable and workable combination of features would be known to persons skilled in the relevant art after reviewing the present disclosure.

What is claimed is:

1. A hydraulic system for a molding system, the molding system having a clamp actuator and an injection actuator, the hydraulic system comprising:
   a clamp accumulator for storing hydraulic fluid for use in actuating the clamp actuator;
   an injection accumulator for storing hydraulic fluid for use in actuating the injection actuator;
   a pump for conveying hydraulic fluid to the clamp accumulator and the injection accumulator;
   a selector valve for selectively fluidly connecting the pump to one of the clamp accumulator and the injection accumulator;
   a reservoir for storing hydraulic fluid, wherein the pump is connected to the reservoir and wherein the pump is configured to convey hydraulic fluid from the reservoir through the selector valve to one of the injection accumulator and the clamp accumulator;
   a sensor configured to measure a property of the hydraulic fluid; and
   a controller connected to the sensor for receiving the measurements from the sensor, the controller connected to the pump for controlling the conveyance of hydraulic fluid from the pump, the controller having:
   a memory for storing instructions; and
   a processor for executing the instructions stored on the memory to control the operation of the pump based on the received measurements.

2. The hydraulic system of claim 1, wherein the sensor is configured to measure the property of the hydraulic fluid in one of the clamp accumulator and the injection accumulator.

3. The hydraulic system of claim 1 wherein the controller further comprises a timer for timing an injection cycle, and wherein the processor controls the operation of the pump based on the received measurements and based on a time during the injection cycle.

4. The hydraulic system of claim 1 wherein the sensor is a pressure sensor and the measured property is a pressure of the hydraulic fluid.

5. The hydraulic system of claim 4, wherein the sensor is connected to the clamp accumulator and the sensor is configured to measure the pressure of the hydraulic fluid in the clamp accumulator.

6. The hydraulic system of claim 4, wherein the sensor is connected to the injection accumulator and the sensor is configured to measure the pressure of the hydraulic fluid in the injection accumulator.

7. The hydraulic system of claim 4, wherein the sensor is configured to measure the pressure of the hydraulic fluid between the injection accumulator and the injection actuator.

8. The hydraulic system of claim 4, wherein the sensor is configured to measure the pressure of the hydraulic fluid between the clamp accumulator and the clamp actuator.

9. The hydraulic system of claim 1 wherein the selector valve comprises an injection circuit valve configured to selectively connect and disconnect the pump to the injection accumulator, and a clamp circuit valve configured to selectively connect and disconnect the pump to the clamp accumulator.

10. The hydraulic system of claim 1 wherein the injection accumulator is fluidly connected to the injection actuator and wherein the clamp accumulator is fluidly connected to the clamp actuator.

11. The hydraulic system of claim 1 further comprising a second pump fluidly connected to the injection accumulator, the second pump for conveying hydraulic fluid to the injection accumulator.

* * * * *